(No Model.)
W. A. MILFORD.
SAW SWAGE.
No. 425,895. Patented Apr. 15, 1890.
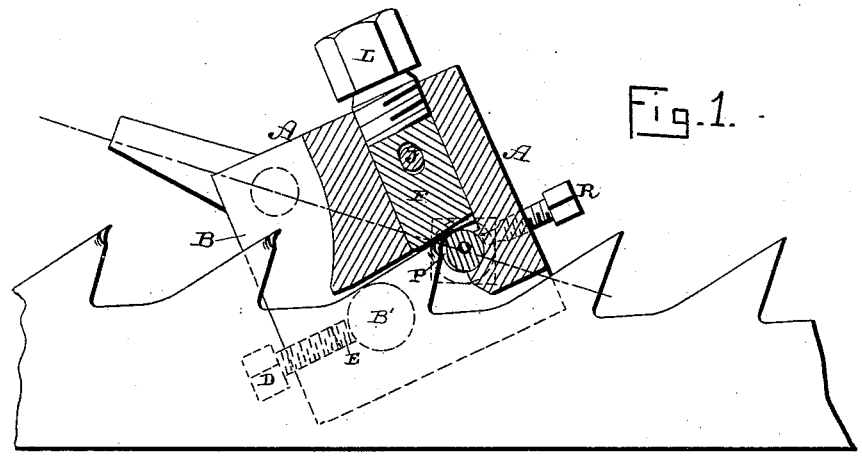
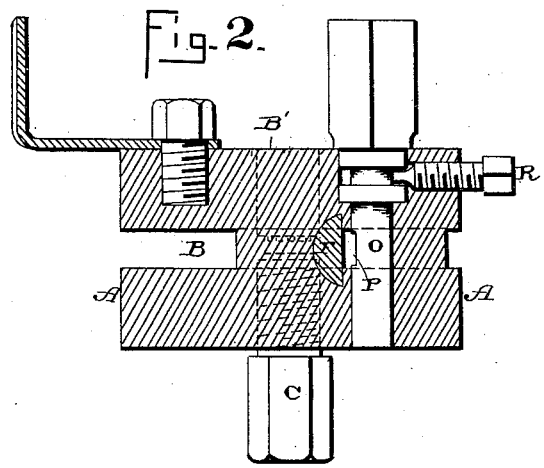
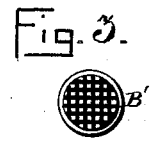
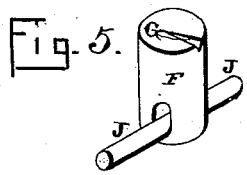
Witnesses:
E. P. Ellis,
L. J. Magie
Inventor:
W. A. Milford,
per F. A. Lehmann,
atty.

UNITED STATES PATENT OFFICE.

WILLIAM A. MILFORD, OF BAY CITY, MICHIGAN, ASSIGNOR TO AMOS S. PARKE, OF SAME PLACE.

SAW-SWAGE.

SPECIFICATION forming part of Letters Patent No. 425,895, dated April 15, 1890.

Application filed November 29, 1889. Serial No. 331,873. (No model.)

*To all whom it may concern:*

Be it known that I, WILLIAM A. MILFORD, of Bay City, in the county of Bay and State of Michigan, have invented certain new and useful Improvements in Saw-Swages; and I do hereby declare the following to be a full, clear, and exact description of the invention, such as will enable others skilled in the art to which it pertains to make and use it, reference being had to the accompanying drawings, which form part of this specification.

My invention relates to an improvement in saw-swages; and it consists in the arrangement and combination of parts which will be more fully described hereinafter.

The object of my invention is to provide a saw-swage which is especially intended for use upon saws, and in which the anvil is so constructed that the point of the tooth will neither split nor break off at its center, and in which the anvil is adjusted in relation to the die so as to regulate the amount that each tooth shall be swaged.

Figure 1 is a vertical section taken through the center of the frame. Fig. 2 is a section taken at right angles to Fig. 1. Figs. 3, 4, and 5 are detail views.

A represents the frame of the swage, which is provided with a groove or opening B, preferably of the shape here shown, for receiving the tooth of the saw to be swaged, and extending at right angles through this frame A from opposite sides are the two set-screws B' C, which catch against the saw from opposite sides, and thus prevent it from having any lateral movement or play. The set-screw B' is made shorter than the one C, and has its inner end serrated or roughened, so as to take a firm hold upon the saw. This set-screw B' is to be adjusted into the desired position and then locked by the set-screw D. In between the inner end of the screw B' and the screw D is placed a follower E, of any soft metal, which will catch against the thread of the screw B' with sufficient force to prevent it from being accidentally moved. The screw C is intended to be tightened and loosened by a wrench provided for that purpose whenever necessary.

Through the frame A is made a suitable opening, which extends down into the slot B, and into this opening is passed the anvil F, which may be round or of any other desired shape, and which has a notch or groove G made partially across its face. This groove is preferably of a triangular shape and serves to prevent the central portion of the tooth from splitting or breaking off when it is swaged. If this groove is not used in the under end of the anvil, it is impossible to swage the tooth to a sufficient degree without splitting the tooth or having its central portion break off, and thus leave a ragged cutting-edge. It is necessary to adjust this anvil in relation to the die for the purpose of regulating the amount of swage that is to be given to each tooth, and for this purpose an oblong hole or opening is made through the anvil, and through this hole the pin or rod J is passed to hold the anvil in its proper position. If the hole were not oblong, the anvil could not be adjusted, and if the pin were not used the anvil would be apt to turn and get the groove in its lower end out of place.

A set-screw L is passed down through the frame and made to bear against the upper end of the anvil, and by screwing up upon this nut L the anvil can be adjusted endwise.

Passing through the frame under the anvil is the partially-revolving die O, which is provided with a groove P, extending partially around its side, and which is wider at one end than the other, so as to give the teeth of the saw the desired shape. The head of this die is considerably larger than the grooved portion, and this head is made to extend a suitable distance into the frame A, so as to give to the die a very strong, solid, and substantial bearing. In the inner end of the head, where it extends into the frame A, is formed a suitable groove, into which the inner end of the set-screw R catches for the purpose of swiveling the die in position. After the point of the tooth has been inserted into the groove B and made to rest upon the anvil the die is given a partial turn by means of a wrench or lever provided for that purpose, and as the cam-groove is brought gradually in contact with the bottom of the tooth it is flattened and spread out, so as to correspond to the shape of the groove.

Having thus described my invention, I claim—

1. In a saw-swage, the combination of the frame having a slot for the reception of the tooth to be swaged, an anvil adjustably supported therein against rotation and having a short groove which extends only partially across its face, for the purpose described, and a partially-revolving die journaled in the frame opposite the said anvil for compressing the said tooth, substantially as shown.

2. In a saw-swage, the combination of the frame having a slot for the reception of the tooth to be swaged, the partially-revolving die journaled therein, and an anvil having a V-shaped groove made in its face in a line with the length of the tooth and diminishing toward the end thereof, and a screw for adjusting the said anvil in relation to the said die, substantially as described.

3. In a saw-swage, the combination of the frame having a slot for the reception of the tooth to be swaged, an anvil adjustably supported therein, and a partially-revolving die which passes through the said frame transversely, said die provided at its center with a groove P directly under the anvil, which extends only partially around it, and an annular groove near one end, and a set-screw which passes longitudinally into the frame and has its inner end engage the said annular groove, whereby the groove P is held at all times in the proper relation to the anvil, substantially as shown and described.

In testimony whereof I affix my signature in presence of two witnesses.

WILLIAM A. MILFORD.

Witnesses:
FRED H. ORMSTON,
A. S. PARKE.